(12) United States Patent
Wu et al.

(10) Patent No.: US 11,005,602 B2
(45) Date of Patent: May 11, 2021

(54) HARQ BUFFER SIZE DESIGN FOR COMMUNICATION SYSTEMS

(71) Applicant: MediaTek Inc., Hsinchu (TW)

(72) Inventors: Wei-De Wu, Hsinchu (TW); Timothy Perrin Fisher-Jeffes, San Jose, CA (US); Yen-Shuo Chang, Hsinchu (TW); Chia-Wei Tai, Hsinchu (TW); Hsien-Kai Hsin, Hsinchu (TW); Pei-Kai Liao, Hsinchu (TW)

(73) Assignee: MediaTek Inc., Taiwan (CN)

( * ) Notice: Subject to any disclaimer, the term of this patent is extended or adjusted under 35 U.S.C. 154(b) by 10 days.

(21) Appl. No.: 16/149,085

(22) Filed: Oct. 1, 2018

(65) Prior Publication Data

US 2019/0103944 A1 Apr. 4, 2019

Related U.S. Application Data

(60) Provisional application No. 62/567,207, filed on Oct. 2, 2017, provisional application No. 62/583,074, filed
(Continued)

(51) Int. Cl.
*H04L 1/18* (2006.01)
*H04L 1/00* (2006.01)

(52) U.S. Cl.
CPC .......... *H04L 1/1835* (2013.01); *H04L 1/0052* (2013.01); *H04L 1/1819* (2013.01); *H04L 1/1822* (2013.01); *H04L 1/1874* (2013.01)

(58) Field of Classification Search
CPC ... H04L 1/0052; H04L 1/1819; H04L 1/1822; H04L 1/1835; H04L 1/1874
See application file for complete search history.

(56) References Cited

U.S. PATENT DOCUMENTS

| | | | |
|---|---|---|---|
| 2010/0067468 A1* | 3/2010 | Ho | H04L 1/1812 370/329 |
| 2014/0362832 A1* | 12/2014 | Rudolf | H04L 1/1822 370/336 |

(Continued)

FOREIGN PATENT DOCUMENTS

| | | | |
|---|---|---|---|
| CN | 102469022 A | | 5/2012 |
| CN | 102892148 A | * | 1/2013 |

(Continued)

OTHER PUBLICATIONS

Taiwan Intellectual Property Office, Office Action for Taiwan Patent Application No. 107134770, dated Aug. 30, 2019.
(Continued)

*Primary Examiner* — Saad A. Waqas
(74) *Attorney, Agent, or Firm* — Han IP PLLC; Andy M. Han

(57) ABSTRACT

Techniques and examples of hybrid automatic repeat request (HARQ) buffer size design for communication systems are described. A user equipment (UE) communicates with a serving cell of a wireless network using a HARQ mechanism, with the communicating involving: (a) determining, by the processor, a respective size of each buffer of a plurality of buffers corresponding to a plurality of HARQ processes on a per-HARQ process basis; and (b) storing, by the processor, respective information in each buffer of the plurality of buffers for a corresponding HARQ process among the plurality of HARQ processes.

20 Claims, 5 Drawing Sheets

Related U.S. Application Data on Nov. 8, 2017, provisional application No. 62/588,056, filed on Nov. 17, 2017.

(56) References Cited

U.S. PATENT DOCUMENTS

| | | | |
|---|---|---|---|
| 2016/0241362 A1* | 8/2016 | El-Khamy | H04L 5/001 |
| 2017/0373809 A1* | 12/2017 | Kim | H03M 13/6362 |
| 2018/0054757 A1* | 2/2018 | Nanri | H04W 28/18 |
| 2018/0054819 A1* | 2/2018 | Meng | H04L 1/1835 |
| 2018/0146439 A1* | 5/2018 | Kim | H04W 52/322 |
| 2018/0199314 A1* | 7/2018 | Takeda | H04L 1/1822 |
| 2018/0254860 A1* | 9/2018 | Wong | H04L 5/0055 |
| 2019/0356426 A1* | 11/2019 | He | H04L 1/1822 |
| 2019/0394000 A1* | 12/2019 | Kim | H04W 72/04 |

FOREIGN PATENT DOCUMENTS

| | | |
|---|---|---|
| CN | 102892148 A | 1/2013 |
| CN | 103428836 A | 12/2013 |
| CN | 105893271 A | 8/2016 |
| WO | WO 2013131558 A1 | 9/2013 |

OTHER PUBLICATIONS

State Intellectual Property Office of China, International Search Report and Written Opinion for International Patent Application No. PCT/CN2018/109305, dated Jan. 3, 2019.

\* cited by examiner

500

COMMUNICATE, BY A PROCESSOR OF A COMMUNICATION ENTITY, WITH ANOTHER COMMUNICATION ENTITY USING A HYBRID AUTOMATIC REPEAT REQUEST (HARQ) MECHANISM
510

DETERMINE, BY THE PROCESSOR, A RESPECTIVE SIZE OF EACH BUFFER OF A PLURALITY OF BUFFERS CORRESPONDING TO A PLURALITY OF HARQ PROCESSES ON A PER-HARQ PROCESS BASIS
520

STORE, BY THE PROCESSOR, RESPECTIVE INFORMATION IN EACH BUFFER OF THE PLURALITY OF BUFFERS FOR A CORRESPONDING HARQ PROCESS AMONG THE PLURALITY OF HARQ PROCESSES
530

FIG. 5

HARQ BUFFER SIZE DESIGN FOR COMMUNICATION SYSTEMS

CROSS REFERENCE TO RELATED PATENT APPLICATION

The present disclosure claims the priority benefit of U.S. Provisional Patent Application Nos. 62/567,207, 62/583,074 and 62/588,056, filed on 2 Oct. 2017, 08 Nov. 2017 and 17 Nov. 2017, respectively, the contents of which are herein incorporated by reference in their entirety.

TECHNICAL FIELD

The present disclosure is generally related to communication systems and, more particularly, to hybrid automatic repeat request (HARQ) buffer size design for communication systems.

BACKGROUND

Unless otherwise indicated herein, approaches described in this section are not prior art to the claims listed below and are not admitted as prior art by inclusion in this section.

In communication systems, HARQ is typically used to enhance reliability of communications to minimize negative impact due to potential corruption of a communication link between a transmitter and a receiver. In HARQ-based communications, only part of encoded bits are sent in each transmission as managed by a corresponding HARQ process. There are costs associated with HARQ-based communications in terms of storage and decoding complexity. With respect to storage, the receiver needs to buffer received bits for decoding if one or more previous transmissions failed. With respect to decoding complexity, for low-density parity-check (LDPC) decoders, decoding complexity relates to the number of coded bits. Both aspects of costs are related to the buffer size of a HARQ process.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

Under various proposed schemes in accordance with the present disclosure, HARQ buffer size may be defined on a per-HARQ process basis instead of a total HARQ buffer allocation. Additionally, a reference transport block size (TBS) may be based on a TBS formula, depending on parameters such as multiple-input-and-multiple-output (MIMO) layer capability and/or a number of physical resource blocks (PRBs). Moreover, a quantized maximum number of PRBs may be utilized in computation of the reference TBS. It is believed that proposed schemes in accordance with the present disclosure may strike an optimal balance between efficiency in storage (e.g., buffer usage) and decoding complexity for UEs and base stations that engage in HARQ-based communications, thereby enhancing overall system performance.

In one aspect, a method may involve a processor of a communication entity communicating with another communication entity using a HARQ mechanism. The communicating may involve: (a) determining, by the processor, a respective size of each buffer of a plurality of buffers corresponding to a plurality of HARQ processes on a per-HARQ process basis; and (b) storing, by the processor, respective information in each buffer of the plurality of buffers for a corresponding HARQ process among the plurality of HARQ processes.

In one aspect, an apparatus may include a transceiver and a processor. The transceiver may be capable of transmitting and receiving information. The processor may be capable of communicating, via the transceiver, with a communication entity (e.g., a user equipment or a serving cell of a wireless network) using a HARQ mechanism. The communicating may involve: (a) determining, by the processor, a respective size of each buffer of a plurality of buffers corresponding to a plurality of HARQ processes on a per-HARQ process basis; and (b) storing, by the processor, respective information in each buffer of the plurality of buffers for a corresponding HARQ process among the plurality of HARQ processes.

It is noteworthy that, although description provided herein may be in the context of certain radio access technologies, networks and network topologies such as Long-Term Evolution (LTE), LTE-Advanced, LTE-Advanced Pro, $5^{th}$-Generation (5G), New Radio (NR) and Internet-of-Things (IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 5 is a flowchart of an example process in accordance with an implementation of the present disclosure.

DETAILED DESCRIPTION OF PREFERRED EMBODIMENTS

Figure 1:
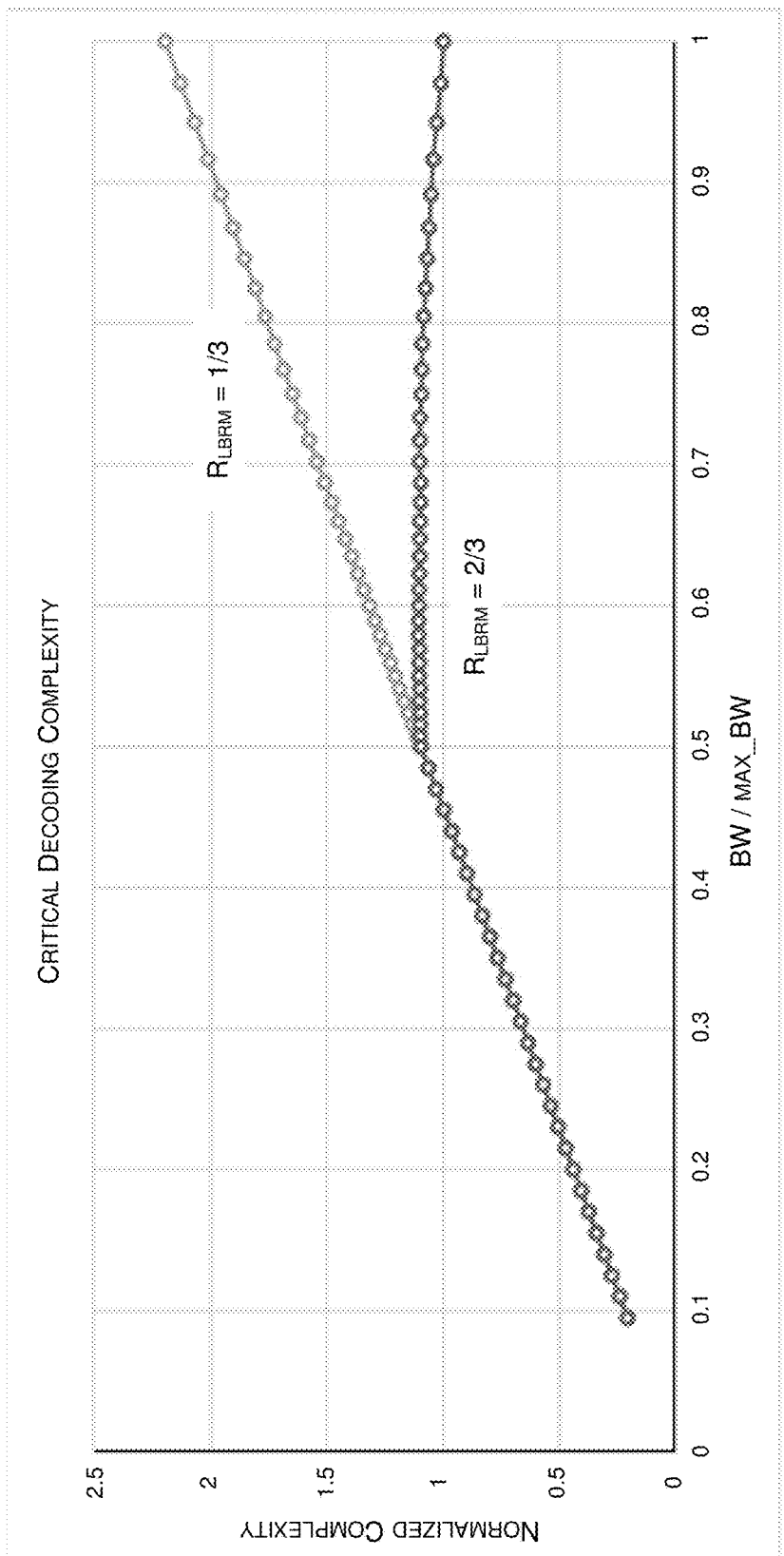
FIG. 1 is a diagram showing an example effect of limited-buffer rate matching (LBRM) on reduction of decoder complexity.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to HARQ buffer size design for communication systems. According to the present disclosure, a number of possible solutions may be implemented separately or jointly. That is, although these possible solutions may be described below separately, two or more of these possible solutions may be implemented in one combination or another.

To confine total buffer cost per communication entity (e.g., user equipment (UE) or base station), one approach is to define a total HARQ buffer size per communication entity category. The buffer size per HARQ process can be derived according to MIMO configuration and time-division duplexing (TDD) configurations. However, if decoder complexity is determined by per-process HARQ buffer size, the decoding complexity for re-transmissions may become excessively high (especially with a small process number) while in most cases (e.g., about 90%) there is only one transmission.

As described below, under various proposed schemes in accordance with the present disclosure, HARQ soft buffer for a UE and/or a base station may be defined or otherwise determined on a per-HARQ process basis instead of a total HARQ buffer allocation. For instance, a per-HARQ buffer dimension may be defined without partitioning the total HARQ buffer among HARQ processes or carriers, leaving the partitioning and management as a UE implementation detail. Additionally, the UE HARQ soft buffer may be based on a reference TBS that is proportional to bandwidth (BW). Moreover, the determination of the HARQ soft buffer size may involve one or more formulas described below. Under the proposed schemes, LBRM may be implemented at the transmit buffer using a lower bound of code rate ($CR_{min}$)=¾ at the headline rate of its capability. Under the proposed schemes, it may be assumed that there is no HARQ buffer sharing between LTE and NR in a dual connectivity (DC) mode. Moreover, it may be assumed that there is no HARQ buffer sharing when provisioning HARQ buffers for LTE and NR in DC mode.

It is noteworthy that the proposed schemes in accordance with the present disclosure are not limited to receiver-side processing. Rather, HARQ buffer size determination in accordance with the proposed schemes may also be utilized in encoding rate-matching, which is part of transmitter-size processing for either uplink transmission or downlink transmission.

Transmit Buffer Rate Matching

Although it would be tempting to not restrict the amount of buffering present on the transmit side of a HARQ process, doing such would have quite significant implications on the complexity of an LDPC decoder on the receive side. Unlike previous turbo codes, the complexity of an LDPC decoder scales with code rate (CR). To achieve the headline rates of NR of 20Gbps, a decoder needs to be provisioned for reasonable average iteration count at such headline rates. Each re-transmission of a HARQ process that halves the CR would roughly more than double the decoder complexity for that particular process. The exact scaling factor depends on LDPC parity check matrix (PCM) edge count for the two CRs, but the higher the initial CR the more extreme the scaling would be. This can only be compensated for by either reducing the average iteration count for re-transmission decodes relative to first transmission decodes or by adding more parallelism to the decoder, or both. It should be noted that headline rates are in practice a rarity. In short, unlike in turbo coding, the sizing of the transmit buffer has a direct impact on the complexity of an LDPC decoder of a receiver.

Thus, it is desirable to implement LBRM at the transmit buffer with a reasonable CR such that the decoder is not over-provisioned at the headline rate it may be designed for. For instance, a scaling code rate for LBRM, $R_{LBRM}$, may be defined so that transmit buffer corresponding to a largest TBS may be supported and applied per HARQ process. With $R_{LBRM}$ defined, reduction in decoder complexity may be achieved.

Under a proposed scheme in accordance with the present disclosure, a little more incremental redundancy (IR) below the headline CR may be allowed to provide some additional coding gain in re-transmissions but without over-provisioning the LDPC decoder. Assuming a headline CR of ⅝, a lower bound $CR_{min}$ of ¾ on headline rates may be reasonable with a consistent demonstrated coding gain of greater than 2dB relative to CR ⅝, in an additive white Gaussian noise (AWGN) channel.

FIG. 1 illustrates a chart 100 of an example effect of LBRM on reduction of decoder complexity. Referring to FIG. 1, the complexity is normalized to the complexity of the maximal BW case when $R_{LBRM}$=⅔ is applied. While LBRM can enable a relatively large reduction in complexity, it is noteworthy that, due to the edge distribution of the LDPC base graph 1 (BG1) PCM, the complexity actually rises by about 15% at ½ maximal BW. This nominal rise is not of concern but it does show quite clearly that the UE decoder power cannot scale with bandwidth part (BWP) BW.

Figure 2:
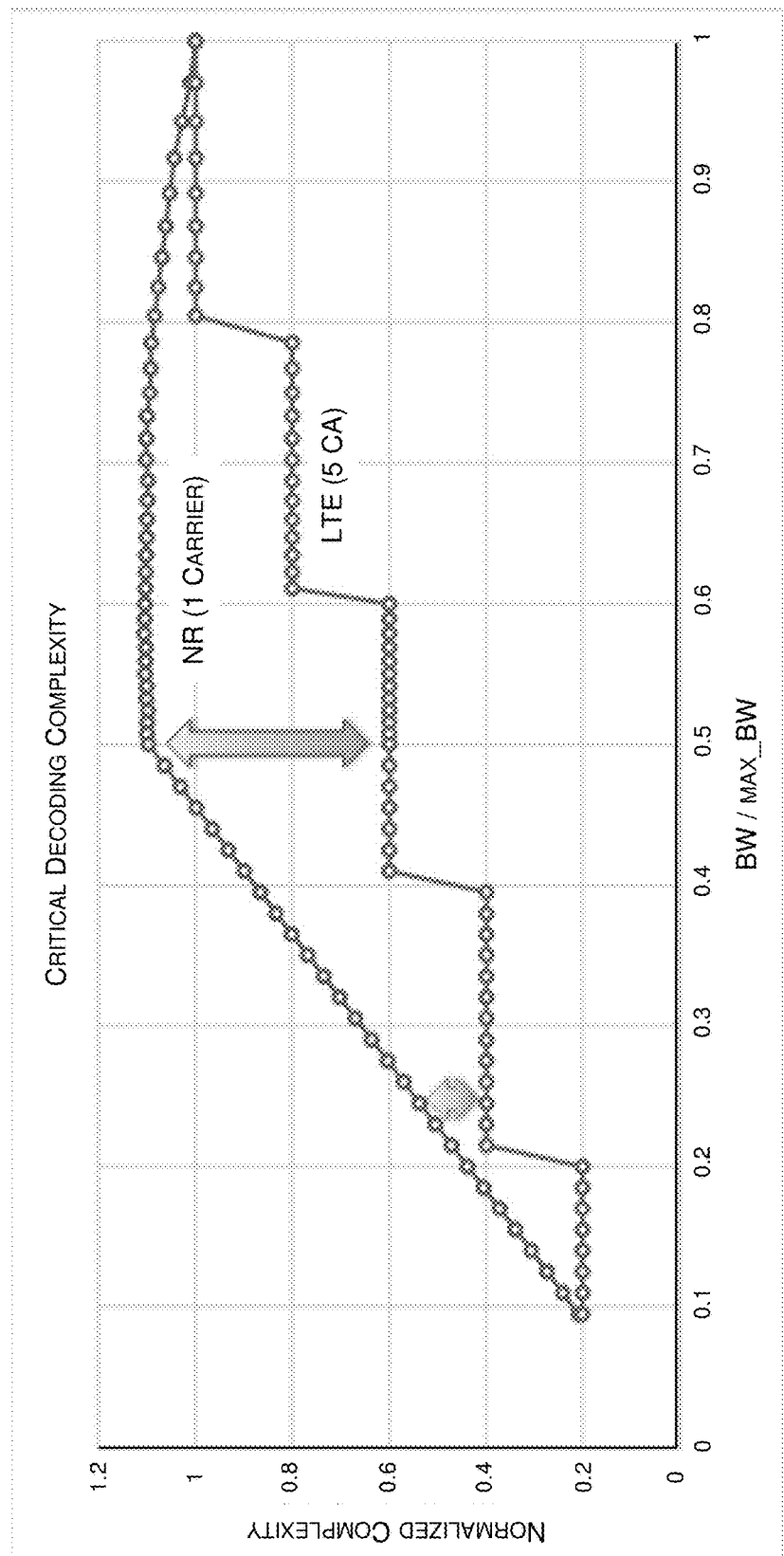
FIG. 2 is a diagram showing an example of critical complexity comparison between NR and LTE.

In particular, for ½ maximal BW, NR UE needs to apply the same clock frequency setting as a maximal BW, while in LTE with a turbo decoder the UE can scale its clock frequency for a smaller BW/carrier aggregation (CA) setting. FIG. 2 illustrates a chart 200 of an example of critical complexity comparison between NR and LTE. Since power consumption is proportional to the clock frequency applied, there is some concern about an inferior user experience in NR relative to LTE. The same is true for NR UL where a base station (e.g., gNB) has critical decoding complexity when supporting two highest-modulation and coding scheme (MCS) UEs with ½ maximal BW for each, which is twice that of supporting a peak-rate UE with the maximal BW. The reason is that the soft buffer size determined by the maximal TBS can accommodate code rate down to ⅓ for each UE with ½ maximal BW. To resolve this issue, a concept of "reference TBS" may be useful in an event that the TBS is also scaled with some reference BWP BW settings.

UE Soft Buffer Dimensioning in NR

To take full advantage of most of the benefit of HARQ in all possible scenarios, there should at least be sufficient buffering within the UE to store all data relating to an initial transmission and a first re-transmission. This would imply that a HARQ buffer dimension needs to be at least as large as the initial transmission and an accompanying slot buffer holding the first re-transmission. The upfront silicon cost of buffering is two-fold. Total costs would include the cost of the buffer itself and then the cost of the decoder complexity in order to achieve decoding of all the data stored in these buffers. As such, an NR LDPC decoder should be provisioned to at least decode this data at its native first transmission CR with reasonable average iteration count. There is the added ongoing UE power consumption cost in buffering where a smaller buffer is usually better as is a smaller contiguous fraction of active buffering. A non-contiguous fragmented buffer is sometimes impossible to place in a low-power mode, depending on the extent of fragmentation of the buffer and how small the physical partitions of the underlying memory are. The exact impact of buffer dimensioning is relevant at the highest possible TBS(s) and would in turn depend on the final TBS calculations.

In view of the above, the present disclosure proposes numerous schemes pertaining to HARQ buffer size design for communication systems. Under each proposed scheme in accordance with the present disclosure, instead of a total HARQ buffer allocation, one or more formulas may be utilized for provisioning soft buffer space on a per-HARQ process basis. It is believed that each proposed scheme removes any ambiguities around how much buffering should be used in different scenarios (e.g., combinations of HARQ process count and carrier count). It is also believed that each proposed scheme enables the hardware decoder and HARQ management to easily scale their power consumption based on active load as well as their area/MIPs based on capability.

Under a first proposed scheme in accordance with the present disclosure, two formulas may be utilized for provisioning soft buffer space on a per-HARQ process basis, as follows:

$$N_{soft-per-HARQ-process} = N_L \cdot BWP \cdot \frac{CR_{max}}{CR_{min}} \quad (1)$$

$$BWP = Q_v \cdot RB_{max} \cdot SC/RB \cdot \text{symbol}/TTI \quad (2)$$

In formulas (1) and (2), $N_L$ denotes a maximum number of layers in the capability, $CR_{max}$ denotes a maximum code rate of headline rate of a first transmission, $CR_{min}$ denotes a scaling code rate, $Q_v$ denotes a modulation order of headline rate, $RB_{max}$ denotes a maximum resource block (RB) allocation of headline rate, SC/RB denotes a number of sub-carriers per source block, and symbol/TTI denotes a number of symbols per transmit time interval (TTI). The soft buffer size may be limited with respect to BWP bandwidth so as to allow decoder power to be scaled to reduce power consumption. Under the proposed scheme, the reference TBS ($TBS_{ref}$) for soft buffer size calculation may be from given MIMO and BW settings. Moreover, under the proposed scheme, $N_L$ and $Q_v$ may be adjusted to further scale decoder power and/or MIMO demodulator power.

It is noteworthy that BWP may be substituted here, such as for maximal coded bits per layer per TTI, which is effectively what formula (2) attempts to portray, albeit without provisioning for common reference signal (CRS) or any other control overhead within a TTI. An important point about the proposed scheme is that it is a per-HARQ process maximum. This has huge implications on the static/predictable scalability of UE power consumption with respect to layer number and bandwidth allocation for a UE. Whether some or all of the parameters listed and used above in formulas (1) and (2) are signaled via downlink control information (DCI) (high speed update), signaled via radio resource control (RRC) messaging (low speed update) or attached to the capability (completely static), it is important to be able to predictably scale the power consumption and decoder area/MIPs accordingly.

Under a second proposed scheme in accordance with the present disclosure, NR soft buffer size may at least scale with BWP BW by utilizing either of a first approach and a second approach. Under the first approach, the reference TBS ($TBS_{ref}$) for soft buffer size calculation may be obtained by a TBS formula (e.g., formula (3) below) with BWP total RB number as a parameter. The formula may be recalculated at a predetermined or otherwise agreed timing when BWP is changed. Under the second approach, the reference TBS may be obtained by a TBS formula (e.g., formula (3) below) with BWP total RB number and MIMO layer number as parameters. The formula may be recalculated at a predetermined or otherwise agreed timing for every change in BWP and/or MIMO configuration. Under the proposed scheme, a formula may be utilized for provisioning soft buffer space on a per-HARQ process basis, as follows:

$$\text{soft buffer size} = \max\_TBS/R_{LBRM}, \; R_{LBRM} = \tfrac{2}{3} \quad (3)$$

In formula (3), max_TBS denotes $TBS_{ref}$ for soft buffer size calculation.

Under a third proposed scheme in accordance with the present disclosure, HARQ soft buffer may be determined based on a reference TBS that is proportional to BW on a per-HARQ process basis, as follows:

$$N_{soft-per-HARQ-process} = N_L \cdot f(BWP) \cdot RA_{max} \cdot \frac{CR_{max}}{R_{LBRM}} \quad (4)$$
$$= \frac{TBS_{ref}(BWP)}{R_{LBRM}}$$

$$RA_{max} = Q_v \cdot RB_{max} \cdot SC \text{ per } RB\text{-symbol} \cdot \text{symbol per } TTI \quad (5)$$

In formulas (4) and (5), $N_L$ denotes a maximum number of layers in the capability, $CR_{max}$ denotes a maximum code rate of headline rate for a first transmission, $R_{LBRM}$ denotes a scaling code rate for LBRM, $Q_v$ denotes a modulation order of headline rate, $RB_{max}$ denotes a maximal RB allocation for a carrier, SC per RB-symbol denotes a number of sub-carriers per RB-symbol, and symbol per TTI denotes a number of symbols per TTI.

Here, $TBS_{ref}$ may be quantized over the maximal RB allocation from BWP configuration. For instance, the maximum number of PRBs may be quantized to provide a quantized maximum number of PRBs, and then $TBS_{ref}$ may be determined using the quantized maximum number of PRBs.

Under the proposed scheme, by selecting some appropriate switching points for the reference TBS, according to formula (6) below for example, the worst-case decoder complexity may be reduced to be in line with that of LTE. More importantly, the decoder clock frequency and, therefore, its power consumption, may be allowed to scale with UE BWP BW.

$$TBS_{ref}(BWP) = \qquad (6)$$

$$TBS_{max} \cdot \begin{cases} 1 & \text{if} & BWP\ RB\ \text{number} > \frac{1}{2} RB_{max} \\ \frac{2}{3} & \text{if} & \frac{1}{3} RB_{max} < BWP\ RB\ \text{number} \le \frac{1}{2} RB_{max} \\ \frac{4}{9} & \text{otherwise} \end{cases}$$

where $TBS_{max} = N_L \cdot RA_{max} \cdot CR_{max}$

Figure 3:
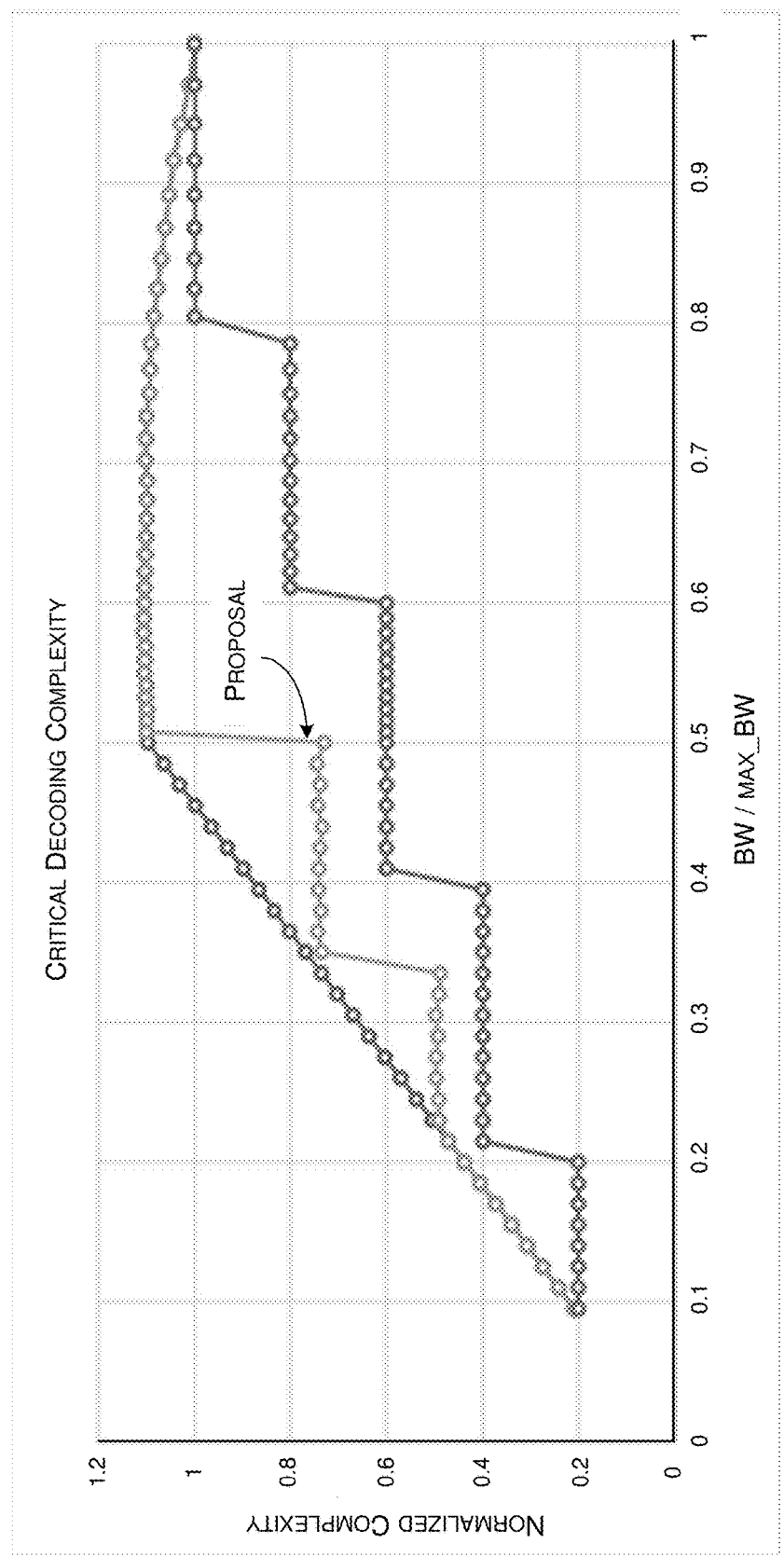
FIG. 3 is a diagram showing an example of critical complexity comparison between NR and LTE with HARQ soft buffering in accordance with an implementation of the present disclosure.

The effect of the proposed scheme on bringing the complexity in line with that expected of LTE can be seen in FIG. 3. FIG. 3 illustrates a chart 300 of an example of critical complexity comparison between NR and LTE with HARQ soft buffering in accordance with an implementation of the present disclosure. Regarding the performance concern on reducing soft buffer size, formula (6) is carefully designed so that the reduced soft buffer can still accommodate code rate ½ or lower. Since practical HARQ operation rarely requires more than two transmissions, the design can thus ensure performance loss rarely observed. In general, the reference TBS design may balance the HARQ performance and decoder complexity reduction so as to realize the best user experience for NR.

UE Soft Buffer Management in NR

To enable the best re-use between carriers and HARQ processes, HARQ buffering may be managed as a circular write buffer rather than a fixed partition per HARQ process buffer like what previous 3GPP standards have defined. It is noteworthy that the reading of the circular buffer may not always be consecutive, in that its start position may be positioned based on the HARQ process of interest but may still be circular in the sense that the read pointer will wrap on end of buffer. HARQ processes may be scheduled in the same order over time and, therefore, a particular unfinished process may not linger in the transmit/receive buffer any longer than any other HARQ process. This places a minor restriction on any base station (e.g., gNB) scheduler at the extreme benefit of a highly efficient use of the shared receiver HARQ buffer with none of the complexities of partitioning the HARQ buffer. The restriction may be a strong but not absolute requirement to maintain a consistent HARQ process schedule order which needs to be present anyway due to higher layers' buffering limits.

In the event that a HARQ process may be missed due to control channel (e.g., DCI) errors, or for some other scheduler reason, a simple monitor of HARQ process number may initiate an immediate move to the back of the buffer of any HARQ process that was seen to be skipped. In the event that a HARQ process lingers in the HARQ buffer due to several re-transmissions, each such re-transmission may initiate a read from its current circular buffer position, chase or IR combine and write to the back of HARQ circular buffer. Accordingly, this may provide a system that always reads previous HARQ data from the HARQ buffer and writes new chase or IR combined HARQ data to the back of the HARQ circular buffer. Advantageously, there would be no complex de-fragmentation schemes necessary under this scheme as the circular buffer mechanism would take care of all the memory management complexity automatically. This would work equally well among several simultaneous independent carriers carrying their own HARQ processes.

In view of the above, under a proposed scheme in accordance with the present disclosure, the total HARQ buffer may be partitioned into subdivisions per carrier and per HARQ process within a carrier. The partitions may be either fixed or configurable. For instance, a per-HARQ buffer dimension may be defined without partitioning the total HARQ buffer among HARQ processes or carriers, leaving the partitioning and management as a UE-implementation detail.

LTE and NR Dual-Connectivity (DC)

Under a proposed scheme in accordance with the present disclosure, with respect to UE soft buffer management, the same HARQ circular buffer scheme described above may be adopted across DC sharing, provided that schedules at a base station adopt the same strategy. However, such scheme likely may not be implemented in LTE networks. Accordingly, sharing of HARQ buffer space between NR and LTE may be prohibited. Thus, under the proposed scheme, it may be assumed that there is no HARQ buffer sharing between LTE and NR in DC mode.

Under the proposed scheme, with respect to UE soft buffer dimensioning, separate maximum HARQ buffer allocations may be allocated for LTE and NR independently with no assumptions about any form of HARQ buffer sharing. That is, under the proposed scheme, it may be assumed that there is no HARQ buffer sharing when provisioning HARQ buffers for LTE and NR in DC mode.

Illustrative Implementations

Figure 4:
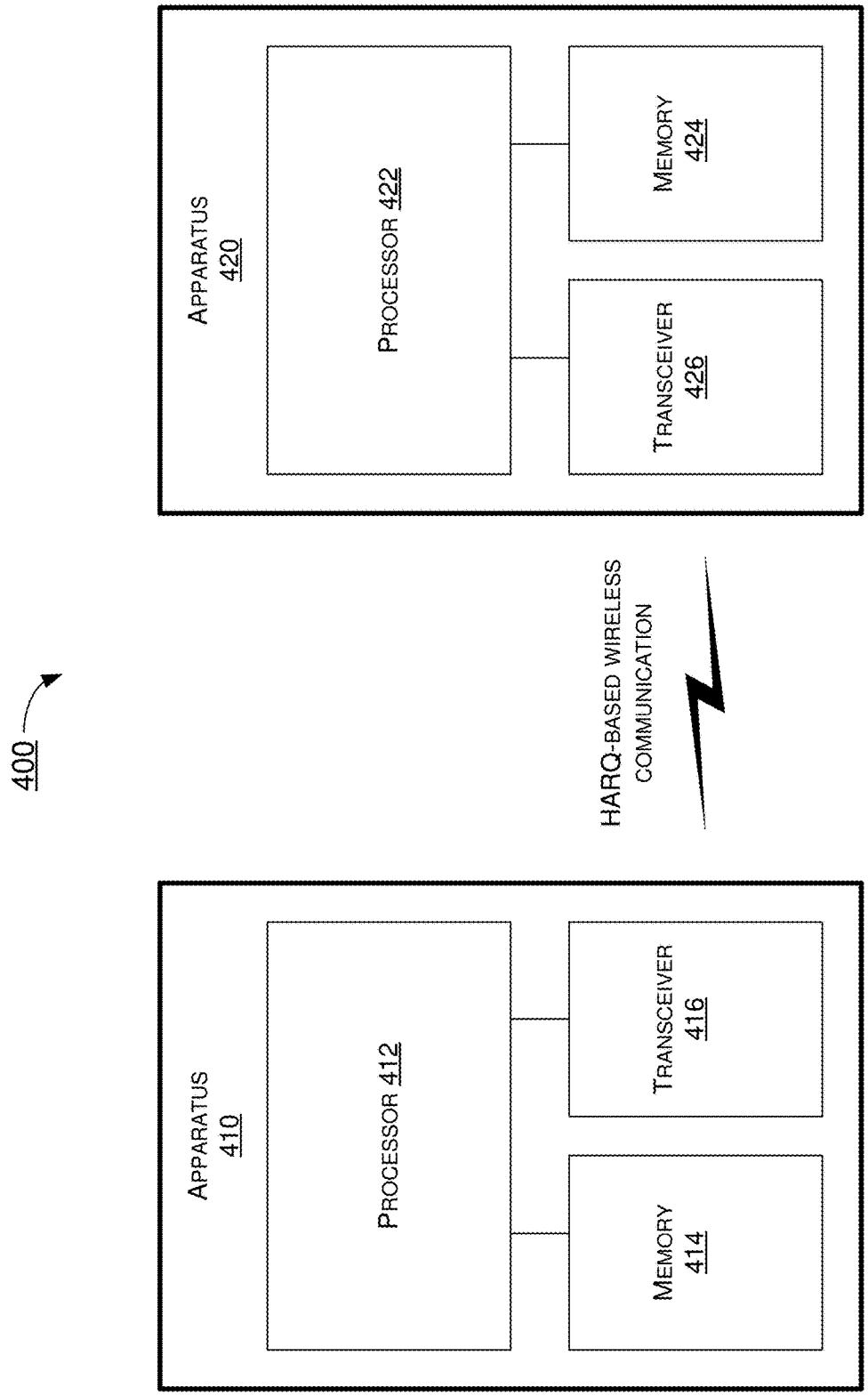
FIG. 4 is a block diagram of an example system in accordance with an implementation of the present disclosure.

FIG. 4 illustrates an example system 400 having at least an example apparatus 410 and an example apparatus 420 in accordance with an implementation of the present disclosure. Each of apparatus 410 and apparatus 420 may perform various functions to implement schemes, techniques, processes and methods described herein pertaining to HARQ buffer size design for communication systems, including the various schemes described above with respect to various proposed designs, concepts, schemes, systems and methods described above as well as process 500 described below.

Each of apparatus 410 and apparatus 420 may be a part of an electronic apparatus, which may be a network apparatus or a UE, such as a portable or mobile apparatus, a wearable apparatus, a wireless communication apparatus or a computing apparatus. For instance, each of apparatus 410 and apparatus 420 may be implemented in a smartphone, a smart watch, a personal digital assistant, a digital camera, or a computing equipment such as a tablet computer, a laptop computer or a notebook computer. Each of apparatus 410 and apparatus 420 may also be a part of a machine type apparatus, which may be an IoT apparatus such as an immobile or a stationary apparatus, a home apparatus, a wire communication apparatus or a computing apparatus. For instance, each of apparatus 410 and apparatus 420 may be implemented in a smart thermostat, a smart fridge, a smart door lock, a wireless speaker or a home control center. When implemented in or as a network apparatus, apparatus 410 and/or apparatus 420 may be implemented in an eNodeB in an LTE, LTE-Advanced or LTE-Advanced Pro network or in a gNB or TRP in a 5G network, an NR network or an IoT network.

In some implementations, each of apparatus 410 and apparatus 420 may be implemented in the form of one or more integrated-circuit (IC) chips such as, for example and without limitation, one or more single-core processors, one or more multi-core processors, or one or more complex-instruction-set-computing (CISC) processors. In the various schemes described above, each of apparatus 410 and apparatus 420 may be implemented in or as a network apparatus or a UE. Each of apparatus 410 and apparatus 420 may include at least some of those components shown in FIG. 4 such as a processor 412 and a processor 422, respectively, for example. Each of apparatus 410 and apparatus 420 may further include one or more other components not pertinent to the proposed scheme of the present disclosure (e.g., internal power supply, display device and/or user interface device), and, thus, such component(s) of apparatus 410 and apparatus 420 are neither shown in FIG. 4 nor described below in the interest of simplicity and brevity.

In one aspect, each of processor 412 and processor 422 may be implemented in the form of one or more single-core processors, one or more multi-core processors, or one or more CISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including those pertaining to HARQ buffer size design for communication systems in accordance with various implementations of the present disclosure.

In some implementations, apparatus 410 may also include a transceiver 416 coupled to processor 412. Transceiver 416 may be capable of wirelessly transmitting and receiving data. In some implementations, apparatus 420 may also include a transceiver 426 coupled to processor 422. Transceiver 426 may include a transceiver capable of wirelessly transmitting and receiving data.

In some implementations, apparatus 410 may further include a memory 414 coupled to processor 412 and capable of being accessed by processor 412 and storing data therein. In some implementations, apparatus 420 may further include a memory 424 coupled to processor 422 and capable of being accessed by processor 422 and storing data therein. Each of memory 414 and memory 424 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 414 and memory 424 may include a type of read-only memory (ROM) such as mask ROM, programmable ROM (PROM), erasable programmable ROM (EPROM) and/or electrically erasable programmable ROM (EEPROM). Alternatively, or additionally, each of memory 414 and memory 424 may include a type of non-volatile random-access memory (NVRAM) such as flash memory, solid-state memory, ferroelectric RAM (FeRAM), magnetoresistive RAM (MRAM) and/or phase-change memory.

Each of apparatus 410 and apparatus 420 may be a communication entity capable of communicating with each other using various proposed schemes in accordance with the present disclosure. For illustrative purposes and without limitation, a description of capabilities of apparatus 410, as a UE, and apparatus 420, as a base station of a serving cell of a wireless network (e.g., 5G/NR mobile network), is provided below. It is noteworthy that, although the example implementations described below are provided in the context of a UE, the same may be implemented in and performed by a base station. Thus, although the following description of example implementations pertains to apparatus 410 as a UE, the same is also applicable to apparatus 420 as a base station.

Under various proposed schemes in accordance with the present disclosure, processor 412 of apparatus 410 as a communication entity (e.g., UE) may communicate with apparatus 420 as another communication (e.g., a base station of a serving cell of a wireless network) using a HARQ mechanism. In communicating with the serving cell, processor 412 may determine a respective size of each buffer of a plurality of buffers corresponding to a plurality of HARQ processes on a per-HARQ process basis. Moreover, processor 412 may store, in memory 414, respective information in each buffer of the plurality of buffers for a corresponding HARQ process among the plurality of HARQ processes.

In some implementations, in determining the respective size of each buffer of the plurality of buffers on the per-HARQ process basis, processor 412 may determine, for each buffer of the plurality of buffers, the respective size based on a reference TBS used in the HARQ mechanism for the corresponding HARQ process among the plurality of HARQ processes.

In some implementations, the reference TBS may be proportional to a BW. Moreover, for each buffer, processor 412 may quantize the reference TBS according to a maximum number of physical resource blocks (PRBs) of a selected BWP.

In some implementations, in determining the respective size based on the reference TBS used in the HARQ mechanism for the corresponding HARQ process, processor 412 may determine the reference TBS based on a respective MIMO layer capability, a respective number of PRBs, or both, used in the HARQ mechanism for the corresponding HARQ process.

In some implementations, in determining the reference TBS based on the respective MIMO layer capability, the respective number of PRBs, or both, used in the HARQ mechanism for the corresponding HARQ process, processor 412 may calculate the reference TBS using the respective MIMO layer capability, the respective number of PRBs, or both, in a predefined TBS formula.

In some implementations, in calculating the reference TBS using the respective MIMO layer capability, the respective number of PRBs, or both, in the predefined TBS formula, processor 412 may recalculate the reference TBS upon a change in a MIMO configuration or a BWP configuration.

In some implementations, in determining the respective size based on the reference TBS used in the HARQ mechanism for the corresponding HARQ process, processor 412 may determine the reference TBS based on a respective maximum number of PRBs over a selected BWP in the HARQ mechanism for the corresponding HARQ process.

In some implementations, in determining the reference TBS based on the respective maximum number of PRBs over the selected BWP in the HARQ mechanism for the corresponding HARQ process, processor 412 may perform a number of operations. For instance, processor 412 may quantize the respective maximum number of PRBs to provide a quantized maximum number of PRBs. Additionally, processor 412 may determine the reference TBS using the quantized maximum number of PRBs.

In some implementations, in determining the respective size of each buffer of the plurality of buffers on the per-HARQ process basis, processor 412 may determine, for each buffer of the plurality of buffers, the respective size based on a reference TBS used in the HARQ mechanism for the corresponding HARQ process among the plurality of HARQ processes. Moreover, the reference TBS may be proportional to a selected BWP. Furthermore, a respective HARQ buffer size per HARQ process may be proportional to the reference TBS ($TBS_{ref}$) and inversely proportional to a limited coding rate ($CR_{limit}$) for each buffer such that the respective HARQ buffer size per HARQ process=$TBS_{ref}/CR_{limit}$.

In some implementations, in determining the respective size of each buffer of the plurality of buffers on the per-HARQ process basis, processor 412 may determine the limited coding rate for each buffer such that a degree of complexity of LDPC decoding is limited accordingly.

Illustrative Processes

FIG. 5 illustrates an example process 500 in accordance with an implementation of the present disclosure. Process 500 may represent an aspect of implementing various proposed designs, concepts, schemes, systems and methods described above. More specifically, process 500 may represent an aspect of the proposed concepts and schemes pertaining to HARQ buffer size design for communication systems. Process 500 may include one or more operations, actions, or functions as illustrated by one or more of blocks 510, 520 and 530. Although illustrated as discrete blocks, various blocks of process 500 may be divided into additional blocks, combined into fewer blocks, or eliminated, depending on the desired implementation. Moreover, the blocks/sub-blocks of process 500 may be executed in the order shown in FIG. 5 or, alternatively in a different order. The blocks/sub-blocks of process 500 may be executed iteratively. Process 500 may be implemented by or in apparatus 410 and apparatus 420 as well as any variations thereof. Solely for illustrative purposes and without limiting the scope, process 500 is described below in the context of apparatus 410 as a UE and apparatus 420 as a base station. Process 500 may begin at block 510.

At 510, process 500 may involve processor 412 of apparatus 410 communicating with a serving cell of a wireless network (e.g., apparatus 420 as a base station of the serving cell) using a HARQ mechanism. In communicating with the serving cell, process 500 may involve processor 412 performing some operations as represented by blocks 520 and 530.

At 520, process 500 may involve processor 412 determining a respective size of each buffer of a plurality of buffers corresponding to a plurality of HARQ processes on a per-HARQ process basis. Process 500 may proceed from 520 to 530.

At 530, process 500 may involve processor 412 storing, in memory 414, respective information in each buffer of the plurality of buffers for a corresponding HARQ process among the plurality of HARQ processes.

In some implementations, in determining the respective size of each buffer of the plurality of buffers on the per-HARQ process basis, process 500 may involve processor 412 determining, for each buffer of the plurality of buffers, the respective size based on a reference TBS used in the HARQ mechanism for the corresponding HARQ process among the plurality of HARQ processes.

In some implementations, the reference TBS may be proportional to a BW. Moreover, for each buffer, process 500 may involve processor 412 quantizing the reference TBS according to a maximum number of PRBs of a selected BWP.

In some implementations, in determining the respective size based on the reference TBS used in the HARQ mechanism for the corresponding HARQ process, process 500 may involve processor 412 determining the reference TBS based on a respective MIMO layer capability, a respective number of PRBs, or both, used in the HARQ mechanism for the corresponding HARQ process.

In some implementations, in determining the reference TBS based on the respective MIMO layer capability, the respective number of PRBs, or both, used in the HARQ mechanism for the corresponding HARQ process, process 500 may involve processor 412 calculating the reference TBS using the respective MIMO layer capability, the respective number of PRBs, or both, in a predefined TBS formula.

In some implementations, in calculating the reference TBS using the respective MIMO layer capability, the respective number of PRBs, or both, in the predefined TBS formula, process 500 may involve processor 412 recalculating the reference TBS upon a change in a MIMO configuration or a BWP configuration.

In some implementations, in determining the respective size based on the reference TBS used in the HARQ mechanism for the corresponding HARQ process, process 500 may involve processor 412 determining the reference TBS based on a respective maximum number of PRBs over a selected BWP in the HARQ mechanism for the corresponding HARQ process.

In some implementations, in determining the reference TBS based on the respective maximum number of PRBs over the selected BWP in the HARQ mechanism for the corresponding HARQ process, process 500 may involve processor 412 performing a number of operations. For instance, process 500 may involve processor 412 quantizing the respective maximum number of PRBs to provide a quantized maximum number of PRBs. Additionally, process 500 may involve processor 412 determining the reference TBS using the quantized maximum number of PRBs.

In some implementations, in determining the respective size of each buffer of the plurality of buffers on the per-HARQ process basis, process 500 may involve processor 412 determining, for each buffer of the plurality of buffers, the respective size based on a reference TBS used in the HARQ mechanism for the corresponding HARQ process among the plurality of HARQ processes. Moreover, the reference TBS may be proportional to a selected BWP. Furthermore, a respective HARQ buffer size per HARQ process may be proportional to the reference TBS ($TBS_{ref}$) and inversely proportional to a limited coding rate ($CR_{limit}$) for each buffer such that the respective HARQ buffer size per HARQ process=$TBS_{ref}/CR_{limit}$.

In some implementations, in determining the respective size of each buffer of the plurality of buffers on the per-HARQ process basis, process 500 may further involve processor 412 determining the limited coding rate for each buffer such that a degree of complexity of LDPC decoding is limited accordingly.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
communicating, by a processor of a communication entity, with another communication entity using a hybrid automatic repeat request (HARQ) mechanism, the communicating involving:
determining, by the processor, a respective size of each buffer of a plurality of buffers corresponding to a plurality of HARQ processes on a per-HARQ process basis by defining a respective buffer dimension for each of the plurality of HARQ processes instead of partitioning a total HARQ buffer among the plurality of HARQ processes;
scaling, by the processor, the respective size of each buffer of the plurality of buffers with bandwidth part (BWP) bandwidth (BW);
scaling, by the processor, a decoder clock frequency with the BWP BW; and
storing, by the processor, respective information in each buffer of the plurality of buffers for a corresponding HARQ process among the plurality of HARQ processes.

2. The method of claim 1, wherein the determining of the respective size of each buffer of the plurality of buffers on the per-HARQ process basis comprises determining, for each buffer of the plurality of buffers, the respective size based on a reference transport block size (TBS) used in the HARQ mechanism for the corresponding HARQ process among the plurality of HARQ processes.

3. The method of claim 2, wherein the reference TBS is proportional to a bandwidth (BW), and wherein, for each buffer, the reference TBS is quantized according to a maximum number of physical resource blocks (PRBs) of a selected bandwidth part (BWP).

4. The method of claim 2, wherein the determining of the respective size based on the reference TBS used in the HARQ mechanism for the corresponding HARQ process comprises determining the reference TBS based on a respective multiple-input-and-multiple-output (MIMO) layer capability, a respective number of physical resource blocks (PRBs), or both, used in the HARQ mechanism for the corresponding HARQ process.

5. The method of claim 4, wherein the determining of the reference TBS based on the respective MIMO layer capability, the respective number of PRBs, or both, used in the HARQ mechanism for the corresponding HARQ process comprises calculating the reference TBS using the respective MIMO layer capability, the respective number of PRBs, or both, in a predefined TBS formula.

6. The method of claim 5, wherein the calculating of the reference TBS using the respective MIMO layer capability, the respective number of PRBs, or both, in the predefined TBS formula comprises recalculating the reference TBS upon a change in a MIMO configuration or a bandwidth part (BWP) configuration.

7. The method of claim 2, wherein the determining of the respective size based on the reference TBS used in the HARQ mechanism for the corresponding HARQ process comprises determining the reference TBS based on a respective maximum number of physical resource blocks (PRBs) over a selected bandwidth part (BWP) in the HARQ mechanism for the corresponding HARQ process.

8. The method of claim 7, wherein the determining of the reference TBS based on the respective maximum number of PRBs over the selected BWP in the HARQ mechanism for the corresponding HARQ process comprises:
    quantizing the respective maximum number of PRBs to provide a quantized maximum number of PRBs; and
    determining the reference TBS using the quantized maximum number of PRBs.

9. The method of claim 1, wherein the determining of the respective size of each buffer of the plurality of buffers on the per-HARQ process basis comprises determining, for each buffer of the plurality of buffers, the respective size based on a reference transport block size (TBS) used in the HARQ mechanism for the corresponding HARQ process among the plurality of HARQ processes, wherein the reference TBS is proportional to a selected bandwidth part (BWP), and wherein a respective HARQ buffer size per HARQ process is proportional to the reference TBS ($TBS_{ref}$) and inversely proportional to a limited coding rate ($CR_{limit}$) for each buffer such that the respective HARQ buffer size per HARQ process=$TBS_{ref}/CR_{limit}$.

10. The method of claim 9, wherein the determining of the respective size of each buffer of the plurality of buffers on the per-HARQ process basis further comprises determining the limited coding rate for each buffer such that a degree of complexity of low-density parity-check (LDPC) decoding is limited accordingly.

11. An apparatus, comprising:
    a transceiver capable of transmitting and receiving information; and
    a processor coupled to the transceiver, the processor capable of communicating, via the transceiver, with a communication entity using a hybrid automatic repeat request (HARQ) mechanism, the communicating involving:
        determining a respective size of each buffer of a plurality of buffers corresponding to a plurality of HARQ processes on a per-HARQ process basis by defining a respective buffer dimension for each of the plurality of HARQ processes instead of partitioning a total HARQ buffer among the plurality of HARQ processes;
        scaling the respective size of each buffer of the plurality of buffers with bandwidth part (BWP) bandwidth (BW);
        scaling a decoder clock frequency with the BWP BW; and
        storing respective information in each buffer of the plurality of buffers for a corresponding HARQ process among the plurality of HARQ processes.

12. The apparatus of claim 11, wherein, in determining the respective size of each buffer of the plurality of buffers on the per-HARQ process basis, the processor is capable of determining, for each buffer of the plurality of buffers, the respective size based on a reference transport block size (TBS) used in the HARQ mechanism for the corresponding HARQ process among the plurality of HARQ processes.

13. The apparatus of claim 12, wherein the reference TBS is proportional to a bandwidth (BW), and wherein, for each buffer, the reference TBS is quantized according to a maximum number of physical resource blocks (PRBs) of a selected bandwidth part (BWP).

14. The apparatus of claim 12, wherein, in determining the respective size based on the reference TBS used in the HARQ mechanism for the corresponding HARQ process, the processor is capable of determining the reference TBS based on a respective multiple-input-and-multiple-output (MIMO) layer capability, a respective number of physical resource blocks (PRBs), or both, used in the HARQ mechanism for the corresponding HARQ process.

15. The apparatus of claim 14, wherein, in determining the reference TBS based on the respective MIMO layer capability, the respective number of PRBs, or both, used in the HARQ mechanism for the corresponding HARQ process, the processor is capable of calculating the reference TBS using the respective MIMO layer capability, the respective number of PRBs, or both, in a predefined TBS formula.

16. The apparatus of claim 15, wherein, in calculating the reference TBS using the respective MIMO layer capability, the respective number of PRBs, or both, in the predefined TBS formula, the processor is capable of recalculating the reference TBS upon a change in a MIMO configuration or a bandwidth part (BWP) configuration.

17. The apparatus of claim 12, wherein, in determining the respective size based on the reference TBS used in the HARQ mechanism for the corresponding HARQ process, the processor is capable of determining the reference TBS based on a respective maximum number of physical resource blocks (PRBs) over a selected bandwidth part (BWP) in the HARQ mechanism for the corresponding HARQ process.

18. The apparatus of claim 17, wherein, in determining the reference TBS based on the respective maximum number of PRBs over the selected BWP in the HARQ mechanism for the corresponding HARQ process, the processor is capable of:
    quantizing the respective maximum number of PRBs to provide a quantized maximum number of PRBs; and
    determining the reference TBS using the quantized maximum number of PRBs.

19. The apparatus of claim 11, wherein, in determining the respective size of each buffer of the plurality of buffers on the per-HARQ process basis, the processor is capable of determining, for each buffer of the plurality of buffers, the respective size based on a reference transport block size (TBS) used in the HARQ mechanism for the corresponding HARQ process among the plurality of HARQ processes, wherein the reference TBS is proportional to a selected bandwidth part (BWP), and wherein a respective HARQ buffer size per HARQ process is proportional to the reference TBS ($TBS_{ref}$) and inversely proportional to a limited coding rate ($CR_{limit}$) for each buffer such that the respective HARQ buffer size per HARQ process=$TBS_{ref}/CR_{limit}$.

20. The apparatus of claim 19, wherein, in determining the respective size of each buffer of the plurality of buffers on the per-HARQ process basis, the processor is further capable of determining the limited coding rate for each buffer such that a degree of complexity of low-density parity-check (LDPC) decoding is limited accordingly.

\* \* \* \* \*